9396X
PATENTED FEB. 13, 1836.
A. HENKEL.
CUTTING SAUSAGE MEAT.
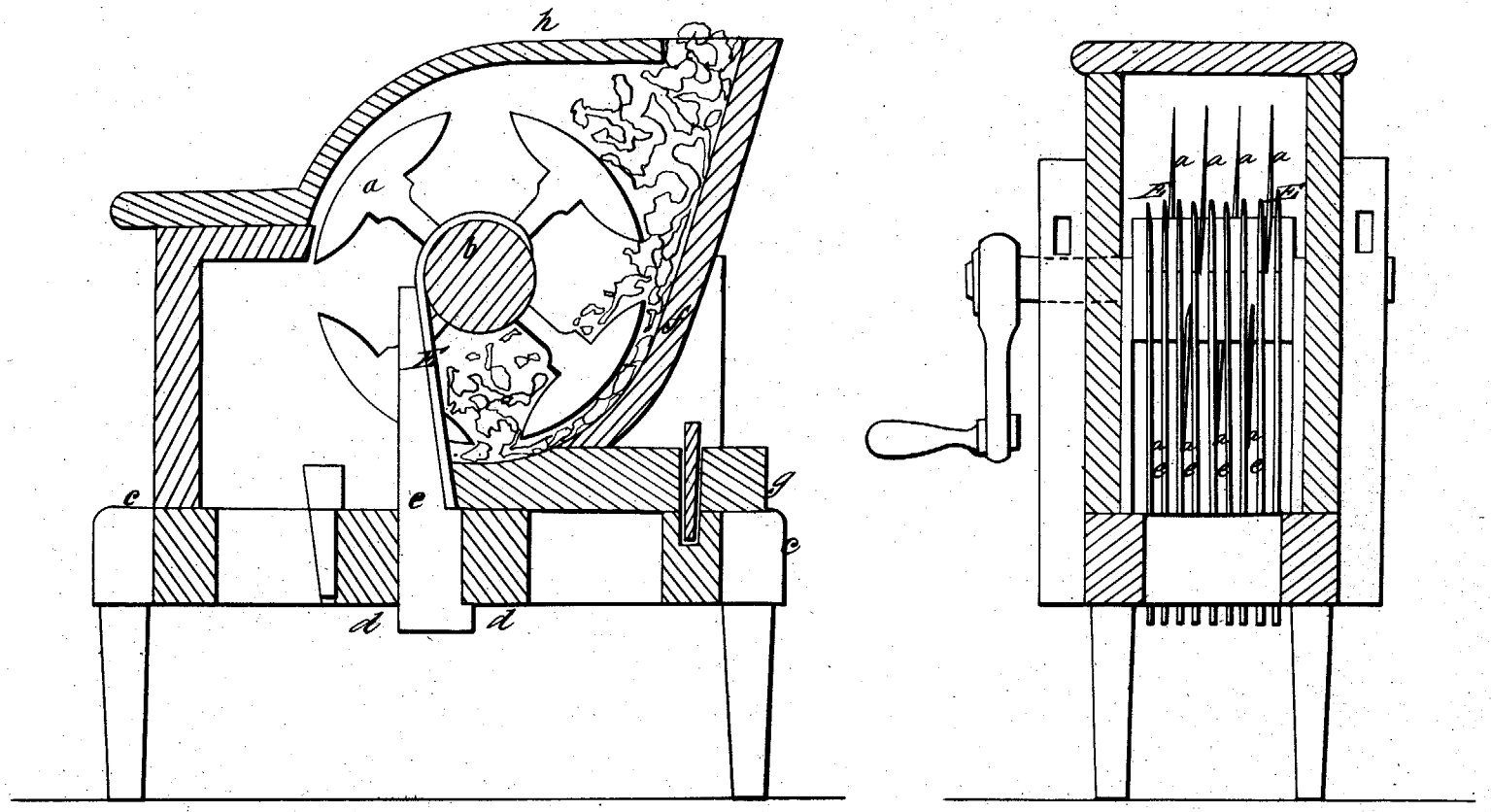

Ar 15 9396X

Feb. 13. 1836 2

Ambrose Henkel, of New Market, Va.
Letters Patent

The schedule referred to in these Letters Patent, and making part of the same, containing a description in the words of the said Ambrose Henkel himself of his improvement in the machine for cutting sausage meat and other substances —

---

To all to whom these presents shall come; Be it known that I, Ambrose Henkel of the town of New Market, in the County of Shenandoah, and State of Virginia, have invented a new and useful sausage cutting machine, which may also be used for cutting many other substances, and that the following is a full and exact description thereof, First, this machine consists of eight strong curved knives with with the cutting edge on the convex edge, six inches long, and one and a half inch wide; placed in a spiral manner, at equal distances around a solid wooden cylinder, which is six inches long and three and a half inches in diameter: the shanks of the knives passing through the cylinder, and secured by a screw tap, countersunk flush with the surface of the cylinder. Secondly of a box, eighteen inches long and six inches wide in area, nine inches high, one end left open, without a bottom — In the middle of this box there are two upright pieces nailed on the outside, fourteen inches long, four inches wide and one and half inch thick, with a cleft from the top down, two inches in width, to receive the gudgeons of the cylinder, which are confined down with two keys placed in the side pieces — This box is confined to a frame, made of scantling two by three inches thick the area of which is the same size as that of the said box. It is necessary for the side pieces of the frame to extend out from the frame far enough to receive legs — There are also two cross pieces in the middle of this frame of the same size timber as that of the frame, the one placed stationary immediately under the cylinder, the other moveable, with two wedges before it — Between these two cross pieces are confined nine wooden upright bars, which extend six inches above the top of the frame. These bars are two inches wide at bottom, tapering to one inch at top, the front edge is one half inch thick, tapering back nearly to a sharp edge — There is a vacancy, between the upright bars, sufficient to admit the passage of the knives — these upright bars also extend below the cross pieces of

9396X the frame far enough to admit a notch being cut in one edge, to fit the sta-
tionary cross piece - It is necessary that these upright bars be plated in the front
with strong strap iron, extending two inches higher than the bars, bending round
the cylinder and tapering to a point, in order to guide the knives - When the
moveable cross piece is wedged up tight against the upright bars, they then stand
firm in a perpendicular manner, forming a comb, when the cylinder is turned
the knives alternately pass through the spaces. The plated edges of the upright
bars ought to range with the front side of the gudgeons of the cylinder — —
Thirdly:- of a moveable concave bed, which is placed in the open end of the
box, fitting close up to the circle of the knives, in order to confine the meat
in reach of the knives - This concave bed consists of a concave board as high as
the box, with two sideboards of the same hight each fitting at one end close up
to the upright bars and cylinder: and are as thick as the space is between the
outside knives and the box, so that when the cylinder is turned the outside knives
will touch lightly in the inner sides of these side boards. The upper edges of these
side boards are bevelled off to an edge, so that the meat may not lodge on them.
There is also a bottom boarde, which is bevelled off to an edge at the end next to
the upright bars forming a part of the circle of the concave. This board extends
back over the end rail of the frame, with an inch hole through it, and corres-
ponding one through the said end rail, in which a loose pin is placed, in order
to confine the concave bed to its proper place. Fourthly - of a cap, which is placed
on the box, in order to confine the meat of the same length and width of the
box, seven inches high, with an inclined end board, corresponding with the con-
cave board in the concave bed. A hole is left in the cap, large enough to receive
the meat - In making this machine, the dimensions thereof may be varied in
many ways, according to pleasure, viz: It may be geared, so that the cylinder
may have more velocity, a balance wheel may be added. The cylinder may
be made shorter or longer, more or less in diameter, and instead of wood it may
be made of metal. The number of knives may be increased or lessened: they may
be made longer or shorter, broder or narrower, more curved or straighter —
Instead of being only bevelled on one side, they may be bevelled on both sides.
they may be set wider apart, or closer together, and instead of their being placed
singly in a spiral manner round the cylinder they may be placed in such a manner that two or more may pass through the upright bars at the same
time. The upright bars may be broader or narrower; they may evenly be made
like knives; they may be made entirely of metal, they may be made to extend up
to the cap, they may be curved backwards or forewards, they may be set horizontally
or obliquely, farther forewards or farther under the cylinder. — — — —
The concave bed may be perforated with half inch holes, when this is the case, the
bottom board is then left away and in its stead only a cross piece is dove tailed
in the ends of the side boards of the concave, through or before which the loose pin
in the end rail of the frame can be placed. The concave may also have a lateral
motion by a fixture on the outside, similar to the shaker of a wheat fan or in
any other way that may seem best. The concave board in the concave bed
may be left one inch shorter at the lower end which will then form a grove
at the bottom of the upright bars, into which the bones, that accidentally may
have been left in the meat, will lodge, so that they may not hinder the pro-
gress of cutting. N.B. To arrange the knives in the cylinder, so that they cut
by pairs — to perforate the concave, and to leave a grove for the bones, as above
described, appears, from late trials, to be the most approved plan; Note. —
What I claim as my own invention and not previously known in the above
described machine, is a cylinder with knives. secondly their cutting between bars
of any kind, and thirdly, the general contruction of the machine. — —
Directions for using this machine — The meat is thrown in gradually, and kept
tolerably full, a little hot gravy or water is occasionally added if considered
necessary. It is necessary to place a vessel under the machine to receive the
meat. The meat that does not pass through the holes, or is not drawn through
by the knives can easily when fine enough, be emptied by drawing out the
concave bed. When the knives become dull they can easily be taken out of the
cylinder and sharpened Witnesses — Ambrose Henkel Solomon Henkel Lewis H. Wolfe 1365 nds — Drawing made — Expd. 1156